(12) United States Patent
Aspelund et al.

(10) Patent No.: US 8,931,287 B2
(45) Date of Patent: Jan. 13, 2015

(54) PROCESS AND APPARATUS FOR INJECTING LCD INTO AN OFFSHORE INJECTION WELL

(76) Inventors: Audun Aspelund, Trondheim (NO); Henrik Krogstad, Heimdal (NO); Tor Erling Sandvik, Trondheim (NO); Jan Einar Fivelstad, Orkanger (NO); Roar Frode Henningsen, Trondheim (NO); Leif Roar Wongraven, Eiksmarka (NO); Tor Erik Hilden, Stavanger (NO); Narve Oma, Røyneberg (NO)

( * ) Notice: Subject to any disclaimer, the term of this patent is extended or adjusted under 35 U.S.C. 154(b) by 1867 days.

(21) Appl. No.: 11/632,491

(22) PCT Filed: Jul. 14, 2005

(86) PCT No.: PCT/GB2005/002781
§ 371 (c)(1),
(2), (4) Date: Jan. 18, 2008

(87) PCT Pub. No.: WO2006/008486
PCT Pub. Date: Jan. 26, 2006

(65) Prior Publication Data
US 2008/0256959 A1   Oct. 23, 2008

(30) Foreign Application Priority Data
Jul. 16, 2004   (GB) .................... 0416003.2

(51) Int. Cl.
*F17C 9/02*   (2006.01)
*F17C 9/00*   (2006.01)

(52) U.S. Cl.
CPC ........... *F17C 9/00* (2013.01); *F17C 2205/0364* (2013.01); *F17C 2221/013* (2013.01); *F17C 2223/0153* (2013.01); *F17C 2223/033* (2013.01); *F17C 2223/047* (2013.01); *F17C 2225/0123* (2013.01); *F17C 2225/035* (2013.01); *F17C 2227/0135* (2013.01); *F17C 2227/0178* (2013.01); *F17C 2227/0185* (2013.01); *F17C 2227/0302* (2013.01); *F17C 2250/01* (2013.01); *F17C 2265/017* (2013.01); *F17C 2270/0105* (2013.01); *F17C 2270/0121* (2013.01); *F17C 2270/0155* (2013.01); *Y02C 10/14* (2013.01)
USPC ..................................................... 62/50.2

(58) Field of Classification Search
CPC ... Y02C 10/14; F17C 9/00; F17C 2205/0364; F17C 2221/013; F17C 2223/0153; F17C 2223/033; F17C 2223/047; F17C 2225/0123; F17C 2225/035; F17C 2227/0135; F17C 2227/0178; F17C 2227/0185; F17C 2227/0302; F17C 2250/01; F17C 2265/017; F17C 2270/0105; F17C 2270/0121; F17C 2270/0155
USPC ........ 62/50.2, 50.7, 53.1, 53.2; 166/357, 268, 166/344
See application file for complete search history.

(56) References Cited

U.S. PATENT DOCUMENTS 3,106,071 A * 10/1963 Green et al. .................... 62/50.1
3,809,153 A * 5/1974 Kober ............................. 165/62

(Continued)

FOREIGN PATENT DOCUMENTS

EP   0 525 287 A1   2/1993
WO   WO 03/066423 A1   8/2003

*Primary Examiner* — John F Pettitt
*Assistant Examiner* — Ignacio E Landeros
(74) *Attorney, Agent, or Firm* — Bacon & Thomas, PLLC

(57) ABSTRACT

A water-going liquefied carbon dioxide (LCD) transport vessel having a pressurized and refrigerated LCD container, a cargo discharge pump within the container for pumping LCD out of] the container along a conduit, a booster pump for pumping LCD along the conduit to a platform, a first backflow line downstream of the cargo pump to the container, a second backflow line from downstream of the booster pump to the container, and optionally a heater arranged to heat LCD flowing from the vessel along the conduit.

25 Claims, 1 Drawing Sheet

(56) References Cited

U.S. PATENT DOCUMENTS

| | | | |
|---|---|---|---|
| 3,874,399 A * | 4/1975 | Ishihara | 137/13 |
| 4,212,354 A * | 7/1980 | Guinn | 166/303 |
| 5,129,759 A * | 7/1992 | Bishop | 405/59 |
| 5,243,821 A * | 9/1993 | Schuck et al. | 62/50.6 |
| 6,178,755 B1 * | 1/2001 | Castellanet | 62/50.1 |
| 6,517,286 B1 * | 2/2003 | Latchem | 405/53 |
| 6,739,140 B2 * | 5/2004 | Bishop et al. | 62/53.1 |
| 7,179,144 B2 * | 2/2007 | De Baan | 441/5 |
| 7,891,197 B2 * | 2/2011 | Winter | 62/50.1 |
| 2003/0099517 A1 * | 5/2003 | Poldervaart | 405/224.2 |
| 2004/0074241 A1 | 4/2004 | Bishop et al. | |
| 2005/0061396 A1 * | 3/2005 | Landry et al. | 141/388 |
| 2007/0068176 A1 * | 3/2007 | Pozivil | 62/45.1 |

* cited by examiner

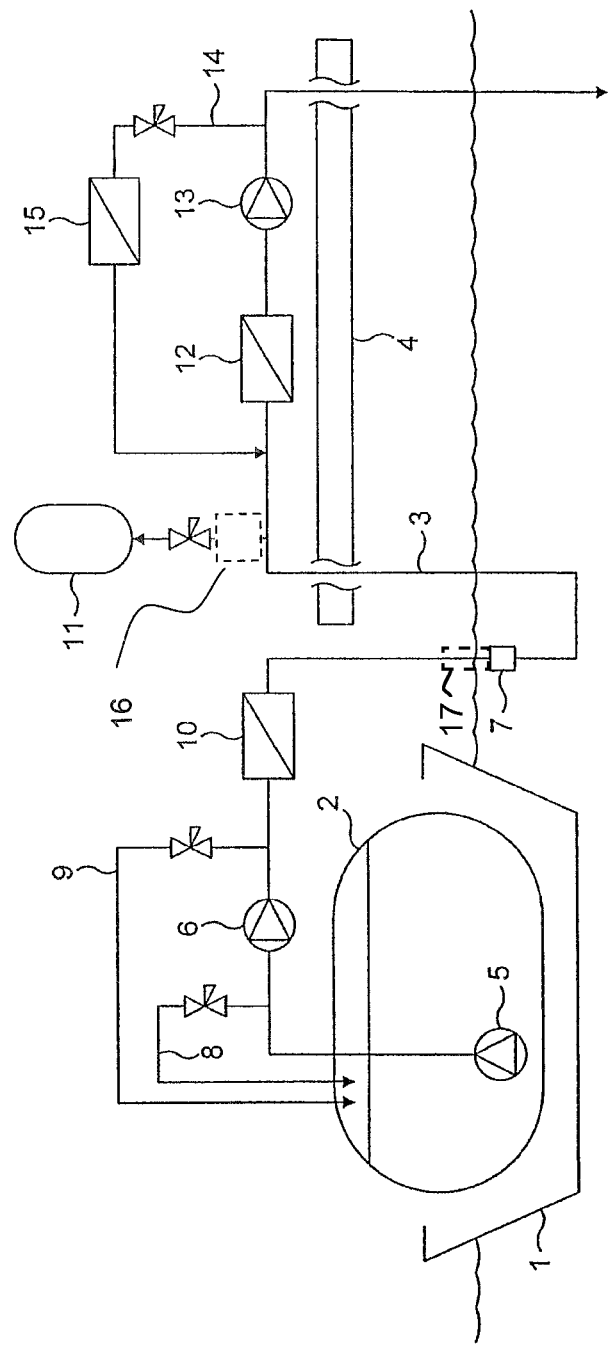

US 8,931,287 B2

PROCESS AND APPARATUS FOR INJECTING LCD INTO AN OFFSHORE INJECTION WELL

FIELD OF THE INVENTION

This invention relates to improvements in and relating to the processes and apparatus for the transfer of liquid carbon dioxide (LCD) from a water-going LCD transport vessel to an injector well-head, and to water-going LCD transport vessels.

BACKGROUND

Carbon dioxide ($CO_2$) is a gas produced as a by-product in large quantities in certain industrial operations, e.g. the manufacture of ammonia. Release of this by-product into the atmosphere is undesirable environmentally as it is a greenhouse gas. Much effort has thus been made towards the development of techniques for the disposal of $CO_2$ in a way other than simple release to the atmosphere. One technique of particular interest is to pump the $CO_2$ into porous sub-surface strata (i.e. lock), e.g. down an injector well in an oil field.

Subsurface disposal can be simply into porous strata or beneficial advantage of the subsurface disposal can be realised if the stratum into which it is disposed is hydrocarbon-bearing as the injected $CO_2$ serves to drive hydrocarbon (e.g. oil or gas) in the stratum towards the producer wells (i.e. wells from which hydrocarbon is extracted). Injection of $CO_2$ is thus one standard technique in late stage reservoir management for achieving enhanced recovery of hydrocarbons.

The quantities of carbon dioxide involved when disposal is by subsurface injection are immense, generally of the order of millions of tonnes. This poses problems in terms of transporting the $CO_2$ from the site at which it is created to the site at which it is injected, especially where the injection site is offshore. Carbon dioxide at ambient temperatures and pressures is gaseous and, if transported batchwise, such voluminous containers are required that the process would be unfeasible. While transport by pipeline might in some circumstances be feasible, the required infrastructure is expensive. It is therefore desirable to transport the carbon dioxide, especially to offshore injection sites, batchwise in liquid form.

Transport of liquid carbon dioxide is however not a problem- or expense-free exercise. If the liquid $CO_2$ is not refrigerated, the pressures required to maintain it in the liquid state are high (60-70 bar) making the required wall thicknesses of the pressurized containers high and making such containers for large scale unrefrigerated liquid $CO_2$ transportation immensely expensive. Transport of liquid $CO_2$ at sub-ambient temperatures reduces the required pressures and required container wall thicknesses but is expensive since refrigeration is required and, as carbon dioxide has a solid phase, there is a risk that solid carbon dioxide can form. Solid carbon dioxide formation makes $CO_2$ transfer by pumping problematic and, due to the risks of pipe or valve blockage, potentially dangerous.

Thus in balancing the economies of refrigeration and container cost and avoiding the risk of solid $CO_2$ formation, in any given circumstances there will generally be a temperature and pressure which is optimal for the liquid $CO_2$ in the containers, e.g. a temperature which is below ambient and a pressure which is above ambient but still sub-critical (the critical point of $CO_2$ is 73.8 bar A). Typically for large scale liquid $O_2$ transport the optimum temperature is likely to be in the range −55 to −48° C. and the pressure is likely to be 5.5 to 7.5 bar A, i.e. corresponding to the position in the phase diagram for $CO_2$ which is just above the triple point in terms of temperature and pressure. The triple point for $CO_2$ is 5.2 bar and −56.6° C. Higher pressures require more expensive containers; and lower pressures and temperatures raise the risk of solid formation.

The type of pressurised containers used on water-going vessels for transport of liquefied petroleum gas (LPG) from a producer well-head to shore are not generally suitable for transport of LCD since the pressures required for LCD transport are higher. Moreover, the liquid transfer apparatus for transferring LPG from an offshore producer well to the water-going vessel (i.e. ship) are unsuitable for transfer of LCD from the vessel to an injector well-head since LPG does not pose the risk of solids formation that are encountered with LCD.

SUMMARY

Nonetheless there is a need for liquefied gas transport vessels that may be used for transport of LPG, LNG, PLNG and LCD transport and for transfer systems that may safely and efficiently be used for LCD transfer from transport vessel to an offshore injector well-head.

We have now developed an LCD transfer process and apparatus that may safely and efficiently be used for LCD transfer from a transport vessel to an offshore injector well-head. The LCD containers on the transport vessels used according to the invention may moreover be used safely and efficiently to transport LPG, LNG or PLNG from an offshore producer well to shore.

Thus viewed from one aspect the invention provides a process for transferring liquid carbon dioxide from a pressurised and refrigerated liquefied gas container on a water-going transport vessel (hereinafter "a ship") to an offshore injection well connected to a surface platform, said process comprising: connecting said container and said platform with a conduit comprising a flexible section at least part of which is immersed within the water between said vessel and said platform, a first pump, a second pump, a heater, an expansion tank, and a third pump; using said first pump, pumping liquid carbon dioxide from said container along said conduit to said second pump; using said second pump pumping said liquid carbon dioxide along said conduit and past said heater to said third pump; using said heater heating said liquid carbon dioxide before it reaches said third pump, preferably before it enters said part of said flexible section which is immersed in water; using said third pump to pump said liquid carbon dioxide down said injection well; using said expansion tank to regulate the pressure in said conduit upstream of said third pump and downstream of the upstream end of said flexible section in the period before operation of said third pump to pump said liquid carbon dioxide down said injection well; and using a pump or pressurised gas to transfer liquid carbon dioxide collected in said expansion tank to said conduit during the period of operation of said third pump to pump said liquid carbon dioxide down said injection well.

In the process of the invention, the vessel for use in LCD transport is preferably provided with at least two pumps, a discharge pump within the LCD container and a booster pump outside the container. The LCD is preferably contained within the container at the temperature and pressure conditions mentioned above, i.e. at a pressure above the triple point.

It will be appreciated that the $CO_2$ may be pumped from the container using alternatives to a conventional pump. Thus, the first 'pump' may be any suitable means to discharge the $CO_2$ from the container.

For example, in one alternative arrangement the $CO_2$ may be discharged from the container to the second (or booster)

pump by pressurising the LCD container to displace the LCD. In this arrangement the minimum pressure of the LCD container is defined by the required pressure at the inlet of the second pump required to avoid formation of vapour bubbles in the pump inlet. The required margin to the bubble point is specified by the required Net Positive Suction Height HPSH for said second pump In an alternative arrangement, the LCD container can be pressurized by vaporizing LCD by means of a heat exchanger placed inside the LCD container, or by vaporizing LCD outside the LCD vessel for injection to the LCD vessel. The transport pressure will be near saturated and the pressure is increased prior to and during unloading of LCD.

The vessel is preferably provided with a heater so that at least part of the heating of the LCD can, if necessary, occur before the LCD enters that portion of the conduit which is immersed. This serves to avoid the need for a heater on the platform or to reduce the demands on the heater on the platform or to ensure that sufficient heating capacity is available as well as to reduce the risk of the submerged section of the conduit icing up and the risk of solid carbon dioxide formation in the conduit leading from the container to the platform. This on-board heater is preferably downstream of the discharge and booster pumps. Some of the carbon dioxide from downstream of the cargo and/or booster pumps is preferably withdrawn, vaporized and fed back into the LCD container to maintain the pressure therein so as to keep the LCD above the triple point and thereby ensure optimum transfer of LCD.

The vessel is desirably also provided with a conduit coupling by means of which at which the conduit from the container may be attached to a flexible conduit leading to a submerged turret loading (STL) system. From the STL, a further flexible conduit (a flexible riser) preferably leads to the sea bed to connect to a sub-sea flowline leading to a further rigid or flexible riser to bring the LCD to the platform. At least those parts of the conduit leading to the platform and which are not submerged are preferably thermally insulated both to prevent undue icing up and condensation from the atmosphere.

The expansion tank on the conduit serves to ensure that the pressure within the conduit does not exceed design pressure during the period between each transfer of LCD from ship to platform. Between each transfer, the LCD in the conduit will absorb heat from the surroundings and expand. The expansion tank serves as a reservoir to accommodate that expansion and the LCD which collects in it can be fed back into the conduit during the subsequent LCD transfer operation.

If not already at the desired temperature for down-hole injection, the LCD reaching the platform is desirably heated to such a temperature using a heater located on the platform. In general, to avoid down hole formation of gas hydrates, the LCD will be heated to about 10° C. or more, preferably 12° C. or more, especially 14 to 20° C. The LCD may similarly be heated to at or above 0° C. to avoid down hole formation of gas hydrates. Such a temperature increase with respect to the transport temperature (i.e. the temperature in the LCD container) involves a concomitant pressure increase to avoid formation of $CO_2$ gas phase during heating and the second (booster) pump should thus have an outlet pressure which ensures the LCD is kept away from the bubble point during heating to the injection temperature.

LCD in the conduit is fed to the injection pump or pumps (e.g. one, two, three or four pumps in series) to bring it to the desired pressure for injection, desirably about 150 to 350 bar, e.g. 200 to 300 bar. One or more of these pumps may be arranged for down-hole water injection when LCD injection is not taking place; however more usually different pumping systems will be used for water and LCD injection, with the conduit systems for both joining after the pumps and more preferably after the manifolds for separation of injection fluid intended for different bores in a multi-bore platform.

Since LCD injection will generally be performed batchwise with water injection occurring between LCD injection from successive LCD transport vessels since the injection well will be kept pressurised during the changeover between water and LCD injections, and since there will be a time delay before the full LCD injection rate is achieved, it is desirable that, in the injection pump start-up phase, carbon dioxide from downstream of the injection pump is recycled into the carbon dioxide flow to the injection pump, optionally during this recycling with cooling.

In a particularly preferred embodiment, the pumps and heater on the LCD transport vessel are arranged to introduce LCD into the immersed section of the flexible conduit at a temperature in the range −50° C. to +0° C. and at a pressure such that the $CO_2$ is in the liquid phase and such that cavitation is avoided. More preferably, however, the booster pump is operated at a pressure which ensures the $CO_2$ gas phase is avoided until it reaches the platform; in this event, a portion of the carbon dioxide may be separated from the main LCD flow, evaporated and recycled into the LCD container so as to maintain the pressure within the LCD container as its contents are discharged. Such a backflow line may be from the pressurised side of the cargo pump, or from the pressurised side of the booster pump. Preferably, however, there will be backflow lines from both downstream of the cargo pump and downstream of the booster pump. The first ensures the flowrate and pressure at the inlet of the booster pump before start-up is appropriate and avoids liquid to gas phase transition in the conduit at start-up. The second ensures the flowrate and pressure to the platform before start-up is appropriate and again assists in preventing undesired liquid to gas phase transition in the conduit at start-up.

The platform is preferably provided with an expansion tank which can accumulate LCD in the period between LCD injections. This tank is preferably off the conduit and attached thereto by a valve which is pressure activated to accommodate increase in the $CO_2$ volume as the $CO_2$ in the conduit is heated by the surroundings. In this way unwanted release of $CO_2$ to the atmosphere may be avoided or minimised. Alternatively the $CO_2$ could be vented directly to atmosphere.

The platform is also preferably provided with a backflow line from the pressured side of the injection pump to the input side of the injection pump. This may be done to ensure a desired flowrate and pressure during start-up until designed injection pressure and flowrate are achieved. To avoid temperature increase at a high backflow rate, the backflow line is preferably provided with a cooler, e.g. a heat exchanger.

Desirably the transport pressure and temperature for the LCD on board ship is 5.2 to 10 bar A corresponding to a temperature of −57 to −40° C.; and the pressure of the LCD as it leaves the ship is preferably 30 to 70 bar A corresponding to a temperature of −50 to 0° C. The pressure of the LCD as it leaves the injection pump depends on the particular well but typically may be 100 to 300 bar A corresponding to a temperature of 10 to 20° C.

The containers, conduits, couplings, pumps, etc. used should therefore be such as to withstand these temperatures and pressures.

Viewed from a further aspect the invention provides an LCD transfer system, said system comprising an LCD transport vessel, a surface platform connected to an injection well, and a conduit connecting said vessel and an LCD injection pump on said platform, said vessel being provided with a pressurised and refrigerated LCD container, a cargo discharge pump within said container for pumping LCD out of said container along said conduit, a booster pump for pumping LCD along said conduit to said platform, a first backflow line downstream of said cargo pump to said container, a second backflow line from downstream of said booster pump to said container, and optionally a first heater arranged to heat LCD flowing from said vessel along said conduit, preferably located downstream of said booster pump, and said platform being provided with an injection pump for injecting LCD down said well, an expansion tank arranged to regulate pressure of LCD in said conduit upstream of said injection pump, a third backflow line from downstream of said injection pump, optionally a second heater arranged to heat LCD in said conduit upstream of said injection pump, and optionally a cooler arranged to cool carbon dioxide in said third backflow line; at least one of said first and second heaters being present in the said system.

Viewed from a still further aspect the invention provides a water-going LCD transport vessel, said vessel comprising a pressurised and refrigerated LCD container, a cargo discharge pump within said container for pumping LCD out of said container along said conduit, a booster pump for pumping LCD along said conduit to said platform, a first backflow line downstream of said cargo pump to said container, a second backflow line from downstream of said booster pump to said container, and optionally a first heater arranged to heat LCD flowing from said vessel along said conduit, preferably located downstream of said booster pump. The LCD container in the vessel for the invention preferably has an internal volume of at least 500 m$^3$, especially 1000 to 10000 m$^3$.

BRIEF DESCRIPTION OF THE DRAWINGS

By a surface platform herein is meant a platform at or above the water surface, e.g. either a fixed or floating platform.

Embodiments of the invention will now be described with reference to the accompanying drawing, in which FIG. 1 is a schematic diagram of an LCD transfer system according to the invention.

Referring to FIG. 1 there is shown a vessel 1 having a refrigerated and pressurised LCD tank 2 connected via conduit 3 to a surface platform 4.

DETAILED DESCRIPTION OF THE EXEMPLARY EMBODIMENTS OF THE DISCLOSURE

Within the LCD container is a cargo pump 5 which drives LCD to a booster pump 6 which itself drives LCD to the platform via STL 7. As discussed above, a conduit coupling 17 can be used to attach the conduit from the container to a flexible conduit leading to the STL 7. Downstream of the cargo and booster pumps 5 and 6 are respectively backflow lines 8 and 9 which feed $CO_2$ back into the LCD container. The ship is also provided with a heater 10 which heats the LCD leaving the ship. The conduit arriving on platform 4 is provided with an expansion tank 11 to accommodate the expansion the LCD due to heating by the surroundings. Following the expansion tank 11 the conduit leads via heater 12 to injection pump 13 which serves to inject LCD down hole. During the period of operation of the injection pump 13, a pump or pressurized gas (shown schematically as box 16) is used to transfer LCD collected in the expansion tank 11 to the conduit. Downstream of injection pump 13 the conduit is provided with a backflow line 14 which feeds excess $CO_2$ back to a position upstream of the heater 12. To avoid overheating of injection pump 13 during the start-up phase, backflow line 14 is itself provided with a heat exchanger 15.

The invention claimed is:

1. A process for transferring liquid carbon dioxide from a pressurised and refrigerated liquefied gas container on a water-going transport vessel to an offshore injection well connected to a surface platform, said process comprising:
    connecting said container and said platform with a conduit comprising a main transfer line comprising a flexible section at least part of which is immersed within the water between said vessel and said platform, a first pump, a second pump, at least one heater, an expansion tank, and a third pump;
    using said first pump to pump liquid carbon dioxide from said container along said conduit to said second pump;
    using said second pump pumping said liquid carbon dioxide along said conduit and past said at least one heater to said third pump;
    using said at least one heater for heating said liquid carbon dioxide before it reaches said third pump, using said third pump to pump said liquid carbon dioxide down said injection well, wherein said at least one heater is connected to the main transfer line of the conduit;
    using said expansion tank to regulate the pressure in said conduit upstream of said third pump and downstream of the upstream end of said flexible section in the period before operation of said third pump to pump said liquid carbon dioxide down said injection well, wherein said expansion tank is connected to the main transfer line of the conduit by a branch line and a valve in a way such that the expansion tank accommodates increases in carbon dioxide volume in the conduit; and
    using a fourth pump or pressurised gas to transfer liquid carbon dioxide collected in said expansion tank to said main transfer line of the conduit during the period of operation of said third pump to pump said liquid carbon dioxide down said injection well,
    wherein said liquid carbon dioxide is maintained at a pressure greater than 5.2 bar during the transferring process so that the liquid carbon dioxide is in a liquid state during the transferring from the gas container to the injection well.

2. A process as claimed in claim 1, wherein the first pump is a discharge pump disposed within the container and the second pump is a booster pump disposed outside the container.

3. A process as claimed in claim 2, wherein the vessel is provided with the at least one heater arranged to heat at least part of the liquid carbon dioxide before entering the portion of the conduit which is immersed in water.

4. A process as claimed in claim 3, wherein the at least one heater is disposed downstream of the discharge and booster pump.

5. A process as claimed in claim 1, wherein the liquefied carbon dioxide in the container is maintained above the triple point.

6. A process as claimed in claim 1, wherein the pumps and the at least one heater are arranged to introduce liquefied carbon dioxide into the immersed section of the flexible conduit at a temperature and at a pressure such that the $CO_2$ is maintained in the liquid phase.

7. A process as claimed in claim 6, wherein the pumps and the at least one heater are arranged to introduce liquefied carbon dioxide into the immersed section of the flexible conduit at a temperature in the range −50° C. to +0° C.

8. The process as claimed in claim 1, further comprising using a heater to heat the liquid carbon dioxide before pumping said liquid carbon dioxide down said injection well to a temperature which avoids down hole formation of gas hydrates.

9. The process as claimed in claim 1, wherein the valve of the expansion tank is a pressure activated valve coupled to an inlet of the expansion tank off of the branch line connected to the main transfer line of the conduit.

10. An LCD transfer system, said system comprising:
an LCD transport vessel,
a surface platform connected to an injection well, and
a conduit connecting said vessel to said surface platform comprising a main transfer line, and
an LCD injection pump on said platform,
said vessel being provided with a pressurised and refrigerated LCD container, a cargo discharge pump within said container for pumping LCD out of said container along said conduit, a booster pump for pumping LCD along said conduit to said platform, a first backflow line downstream of said cargo pump to said container, a second backflow line from downstream of said booster pump to said container, and at least one heater arranged to heat LCD flowing from said vessel along said conduit, said at least one heater connected to the main transfer line of the conduit, and
said platform being provided with an injection pump for injecting LCD down said well, an expansion tank arranged to regulate pressure of LCD in said conduit upstream of said injection pump, and a third backflow line from downstream of said injection pump,
wherein said LCD is maintained at a pressure greater than 5.2 bar during the transferring process so that the LCD is in a liquid state during the transferring from the LCD container to the injection well, and
wherein said expansion tank is connected to the main transfer line of the conduit by a branch line and a valve arranged in a way such that the expansion tank accommodates increases in carbon dioxide volume in the conduit.

11. The LCD transfer system according to claim 10, wherein the at least one heater is provided on said vessel arranged to heat LCD flowing from said vessel along said conduit; or
wherein the at least one heater is provided on said platform arranged to heat LCD in said conduit upstream of said injection pump.

12. The LCD transfer system according to claim 10, further comprising:
a cooler arranged to cool carbon dioxide in said third backflow line.

13. The LCD transfer system according to claim 10, wherein said conduit connecting said container and said platform comprises a flexible section at least part of which is, in use, immersed within water between said vessel and said platform.

14. The LCD transfer system according to claim 10, wherein the apparatus is arranged such that a fourth pump or pressurised gas is used to transfer liquid carbon dioxide collected in said expansion tank to said conduit during a period of operation of said injection pump to pump said liquid carbon dioxide down said injection well.

15. An apparatus for transferring liquid carbon dioxide from a pressurised and refrigerated liquefied gas container on a water-going transport vessel to an offshore injection well connected to a surface platform, said apparatus comprising:
a conduit comprising a main transfer line, said conduit being configured to connect said container and said platform, the main transfer line comprising a flexible section at least part of which is immersed within water between said vessel and said platform;
a first pump;
a second pump;
at least one heater connected to the main transfer line of the conduit;
an expansion tank connected to the main transfer line of the conduit by a branch line and a valve; and
a third pump;
wherein said first pump is arranged to pump liquid carbon dioxide from said container along said conduit to said second pump; wherein said second pump is arranged to pump said liquid carbon dioxide along said conduit and past said at least one heater to said third pump; wherein said at least one heater is arranged to heat said liquid carbon dioxide before it reaches said third pump, wherein said third pump is arranged to pump said liquid carbon dioxide down said injection well;
wherein said expansion tank is arranged to regulate the pressure in said conduit by being arranged to accommodate increases in carbon dioxide volume in the conduit upstream of said third pump and downstream of the upstream end of said flexible section in the period before operation of said third pump to pump said liquid carbon dioxide down said injection well,
wherein the apparatus is arranged such that a fourth pump or pressurised gas is used to transfer liquid carbon dioxide collected in said expansion tank to said conduit during the period of operation of said third pump to pump said liquid carbon dioxide down said injection well, and
wherein said liquid carbon dioxide is maintained at a pressure greater than 5.2 bar during the transfer so that the liquid carbon dioxide is in a liquid state during the transferring from the gas container to the injection well.

16. An apparatus as claimed in claim 15, wherein the first pump is a discharge pump disposed within the container and the second pump is a booster pump disposed outside the container.

17. An apparatus as claimed in claim 16, wherein the vessel is provided with the at least one heater arranged to heat at least part of the liquid carbon dioxide before entering the portion of the conduit which is immersed in water.

18. An apparatus as claimed in claim 17, wherein the at least one heater is disposed downstream of the discharge and booster pump.

19. An apparatus as claimed in any of claim 15, wherein the pumps and at least one heater are arranged to introduce liquefied carbon dioxide into the immersed section of the flexible conduit at a temperature and at a pressure such that the $CO_2$ is in the liquid phase.

20. An apparatus as claimed in claim 19, wherein the pumps and at least one heater are arranged to introduce liquefied carbon dioxide into the immersed section of the flexible conduit at a temperature in the range −50° C. to +0° C.

21. A method of transferring liquid carbon dioxide (LCD) from a pressurised and refrigerated LCD container on an LCD transport vessel via a surface platform to an injection well, wherein said platform comprises an injection pump and an expansion tank, the method comprising:
maintaining the LCD at a pressure greater than 5.2 bar during the transfer so that the LCD is in a liquid state during the transferring from the LCD container to the injection well;
pumping LCD out of said container and along a conduit having a main transfer line using a cargo discharge pump within said container and a booster pump on the conduit;

feeding excess carbon dioxide from downstream of said cargo pump and downstream of said booster pump back to said container using a first and a second backflow line;

injecting LCD down said well using the injection pump;

regulating pressure of LCD in said conduit upstream of said injection pump using said expansion tank, wherein said expansion tank is connected to the main transfer line of the conduit by a branch line and a valve arranged in a way to accommodate for increases in carbon dioxide volume in the conduit;

feeding excess carbon dioxide from downstream of said injection pump back to upstream of the injection pump using a third backflow line; and heating LCD during flow from said vessel along said conduit, and/or in said conduit upstream of said injection pump.

22. A method as claimed in claim 21, comprising heating LCD flowing from said vessel along said conduit.

23. The method as claimed in claim 21, comprising cooling carbon dioxide in said third backflow line using a cooler on said platform.

24. The method as claimed in claim 21, wherein said conduit connecting said container and said platform comprises a flexible section and the method comprises immersing at least part of said flexible section within water between said vessel and said platform.

25. The method as claimed in claim 21, wherein a fourth pump or pressurised gas is used to transfer liquid carbon dioxide collected in said expansion tank to said conduit during the period of operation of said injection pump to pump said liquid carbon dioxide down said injection well.

* * * * *